(12) United States Patent
Kawamura (10) Patent No.: US 6,572,393 B2
(45) Date of Patent: Jun. 3, 2003

(54) CABLE REEL

(75) Inventor: Koushi Kawamura, Yokkaichi (JP)

(73) Assignee: Sumitomo Wiring Systems, Ltd., Mie (JP)

(*) Notice: Subject to any disclaimer, the term of this patent is extended or adjusted under 35 U.S.C. 154(b) by 0 days.

(21) Appl. No.: 10/053,961

(22) Filed: Jan. 24, 2002

(65) Prior Publication Data

US 2002/0111056 A1 Aug. 15, 2002

(30) Foreign Application Priority Data

Feb. 15, 2001 (JP) .................................... 2001-038697

(51) Int. Cl.[7] .............................................. H01R 35/04
(52) U.S. Cl. ............................................... 439/164
(58) Field of Search ................................. 439/164, 15

(56) References Cited

U.S. PATENT DOCUMENTS

| | | | | |
|---|---|---|---|---|
| 5,607,316 A | * | 3/1997 | Ishikawa | 439/164 |
| 5,679,015 A | * | 10/1997 | Schauer | 439/164 |
| 5,685,728 A | * | 11/1997 | Okuhara et al. | 439/164 |
| 5,690,500 A | | 11/1997 | Ishikawa et al. | |
| 5,707,023 A | | 1/1998 | Ichikawa et al. | |
| 5,813,875 A | * | 9/1998 | Ishikawa et al. | 439/164 |
| 5,888,084 A | * | 3/1999 | Mukai et al. | 439/164 |
| 5,993,229 A | * | 11/1999 | Tanaka et al. | 439/164 |
| 6,039,588 A | * | 3/2000 | Osawa | 439/164 |
| 6,224,406 B1 | * | 5/2001 | Takahashi et al. | 439/164 |
| 6,354,854 B1 | * | 3/2002 | Matsuzaki | 439/164 |

FOREIGN PATENT DOCUMENTS

| JP | A 6-333660 | 12/1994 |
|---|---|---|
| JP | A 10-162921 | 6/1998 |

* cited by examiner

Primary Examiner—Gary Paumen
(74) Attorney, Agent, or Firm—Oliff & Berridge, PLC (57) ABSTRACT

A cable reel for installation on the steering apparatus of a vehicle is disclosed. The cable reel includes a stationary member, a rotatable member, a reverse member and a flat cable. The reverse member has a plurality of reverse portions integral with an annular member, the reverse portions being disposed at regular intervals in a circumferential direction around the annular member. The reverse portions may be reverse rings formed by bending and looping arms connected to the annular member. Alternatively the reverse portions may be vacuum-moulded projections. The cable reel winds the flat cable, accommodated by reversal of winding of the flat cable by the reverse member.

21 Claims, 8 Drawing Sheets

CABLE REEL

BACKGROUND OF THE INVENTION

1. Field of Invention

The present invention relates to cable reels of reverse type to be installed on a steering apparatus of a vehicle, and to methods of their formation. More particularly, the present invention relates to the improvement of a reverse ring for reversing a flat cable accommodated in an annular hollow space formed by a movable member and a stationary member.

2. Description of Related Art

Figure 8A:
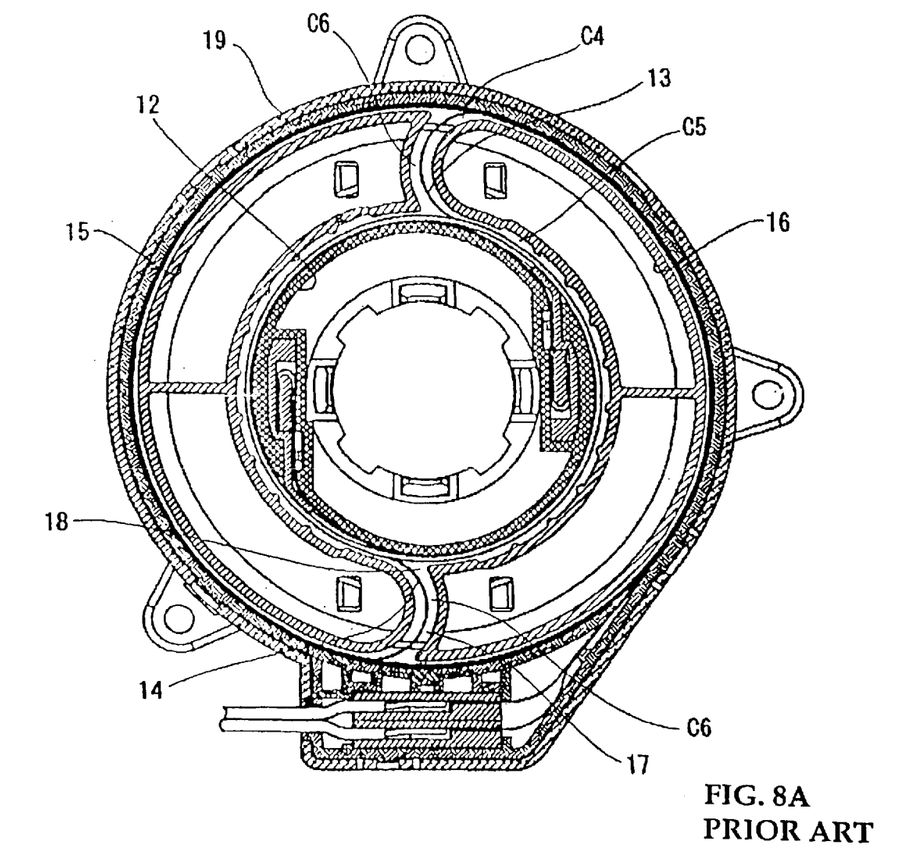
FIG. 8A is a horizontal sectional view of a known cable reel.
Figure 8B:
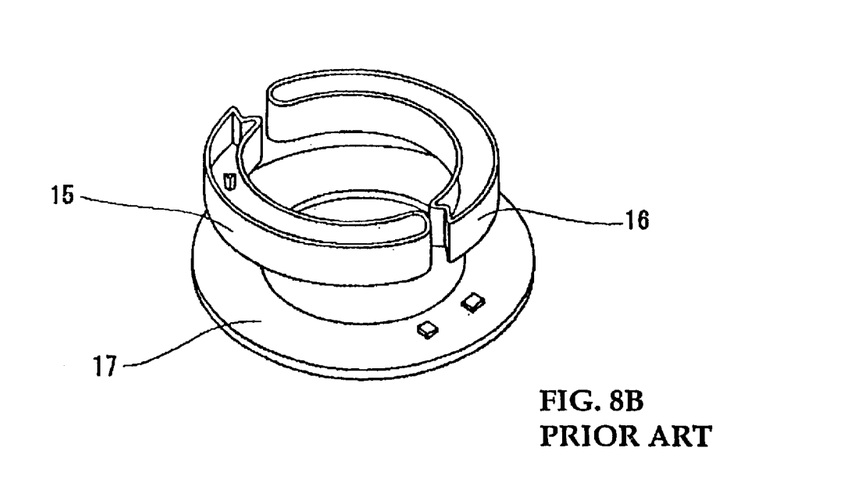
FIG. 8B is a perspective view showing a flat cable-reversing member of the known cable reel of FIG. 8A.

A cable reel of reverse type to be installed on the steering apparatus of a vehicle, as shown in FIGS. 8A and 8B, has been proposed. In the cable reel of FIGS. 8A and 8B, a stationary member 19 serving as an outer cylinder is fixed to a steering column (not shown), and a movable member 12 serving as an inner cylinder is fixed to a steering wheel (not shown). The stationary member 19 and the movable member 12 are connected so as to be rotatable relative to each other. An annular rotary ring 17 made of synthetic resin is freely rotatably accommodated in the annular hollow space 18 formed by the stationary member 19 and the movable member 12. Reverse rings 15 and 16 made of synthetic resin are locked to the rotary ring 17.

In the annular hollow space 18, flat cables 13 and 14 each having one end connected to the movable member 12 are wound in a space C5 disposed between the movable member 12 and the reverse rings 15 and 16 and pass through two reverse gaps C6 disposed between the reverse rings 15 and 16. Then the flat cables 13 and 14 are wound in the opposite direction in a space C4 disposed between the stationary member 19 and the reverse rings 15 and 16. The other end of each of the flat cables 13 and 14 is connected to the stationary member 19.

In this cable reel, when the steering handle or steering wheel is rotated in one direction, the flat cables 13 and 14 pass through the reverse gaps C6 of the reverse rings 15 and 16 by sliding around the U-shape bends at the ends of the reverse rings 15 and 16. In this way, the flat cables 13 and 14 move to the inner side of the reverse ring and are wound on the peripheral surface of the movable member 12. On the other hand, when the steering handle or steering wheel is rotated in the opposite direction, the rewound flat cables 13 and 14 pass through the reverse gaps C6 while they are moving back around the U-shaped bends. The flat cables 13 and 14 move to the outer side of the reverse rings 15 and 16 and are wound on the inner peripheral surface of the stationary member 19.

In the cable reel described above, the reverse rings 15 and 16 are required to reverse the direction of winding of the flat cables 13 and 14. To prevent vibrations of the reverse rings 15 and 16 in the annular hollow space 18, the reverse rings 15 and 16 are locked to the rotary ring 17. That is, to construct the member for reversing the flat cable, three parts are required. These are the two reverse rings 15 and 16 and one rotary ring 17.

With an increase of the number of flat cables in such a cable reel, it is necessary to increase the number of reverse rings. This leads to an increase in the number of component parts and makes the manufacturing cost high.

The reverse rings 15 and 16 are fixed to the rotary ring 17 and thus they are incapable of moving in directions other than the rotary direction. Further, because the reverse rings 15 and 16 are not flexible, there is no change in the width of the space C4 between the stationary member 18 and each of the reverse rings 15 and 16 and that of the space C5 between the movable member 12 and each of the reverse rings 15 and 16.

Accordingly, with an increase in the number of flat cables which pass through each space C5 and C6 due to the rotation of the movable member 12, the width of each space is set, for example, during manufacture by adding an allowance thereto, i.e. each space is made wider if the cable reel carries a larger number of bundles of flat cables. This has the defect that the flat cables 13 and 14 may move freely or loosely in a wider portion of the passage when they are moved in each passage by the rotation of the movable member 12. As a result, the flat cables 13 and 14 generate vibrations and abnormal sounds.

SUMMARY OF THE INVENTION

The present invention seeks to reduce or avoid the above-described problem. Accordingly, it is an object of the present invention to reduce the number of component parts in a cable reel of reverse type. A further object is to reduce or prevent generation of vibrations and/or abnormal sounds when a movable member rotates, by improving members for reversing a flat cable which is accommodated in an annular hollow space of a cable reel of reverse type.

Accordingly, the present invention provides a cable reel that includes:

a stationary member;

a rotatable member located with respect to the stationary member so as to define an annular hollow space between the rotatable and stationary members;

a reverse member accommodated in the annular hollow space, the reverse member including a plurality of reverse portions and an annular member, the reverse member being formed in one piece from; and a flat cable accommodated in the annular hollow space, the flat cable having respective spaced portions fixed with respect to the stationary member and with respect to the rotatable member and an intermediate portion between the spaced portions which is wound on one of the reverse portions.

The reverse member may be made from a resiliently flexible sheet.

Preferably, the reverse portions are radially expansible loops formed so as to press part of the intermediate portion of the flat cable against the stationary member. Typically, each reverse portion is formed by looping an arm projecting from the annular member. Each arm may have a fixed end, fixed to the annular member, and a free end, the free end being slidably movable with respect to the fixed end. Alternatively, each arm may have a fixed end, fixed to the annular member, and a free end., the free end being engageable with the fixed end in order to retain the loop. In that case, the free end of the arm may be engageable with or lockable to the fixed end of the arm via a slot.

The annular member may be disposed centrally of circumferential arm projections which are bent and looped to form the reverse portions.

Preferably, the arm projections are L-shaped.

Each L-shaped arm projection may include a short transverse portion and a long longitudinal portion, the transverse portion connecting the longitudinal portion to the annular member. The slot may be formed on the longitudinal portion, near the fixed end of the arm.

Preferably, to form one of the reverse portions, the transverse portion is bent perpendicularly to the central annular member and the longitudinal portion is looped to form one of the reverse portions. The part of the flat cable wound on each reverse portion may be sandwiched between the outer surface of each reverse ring and the outer wall of the annular hollow portion and, optionally, between the adjacent reverse rings. Thus, when the flat cable moves with the rotation of the movable member, it can be difficult for the flat cable to move freely. This can assist in the suppression of the generation of vibrations and abnormal sounds.

Typically, the central annular member serves as a rotary ring and is disposed on a bottom surface of the annular hollow space. A gap between an inner peripheral surface of each reverse portion and a peripheral surface of the movable member may be identified as an inner peripheral passage for each flat cable to be fixed with respect to the movable member. A gap between the reverse portions adjacent to each other circumferentially may be identified as a reversing passage for each flat cable. A gap between a peripheral surface of each reverse portion and an inner peripheral surface of the stationary member may be identified as an outer peripheral passage for each flat cable.

In use, the rotary ring rotates with the rotation of each reverse ring because the rotary ring is integral with the reverse rings. Thus the rotary ring holds the position of the reverse rings, thus holding the reverse rings in the annular hollow space, with the reverse rings spaced at equal intervals.

In various exemplary embodiments. the reverse member is freely rotatable within the cable reel. That is, the reverse member is not fixed with respect to the rotary member or fixed member. Rotation of the reverse member typically occurs due to tension in the flat cables during winding of the flat cables into the inner peripheral passage. Rotation of the reverse member in the other direction may occur since the flat cables are preferably rigid enough to be capable of pushing the reverse portions during unwinding of the flat cables from the inner peripheral passage.

When the flat cable is wound tightly, the number of turns of the flat cable usually increases. In that case, it may be necessary to increase the width of the inner peripheral passage to accommodate the flat cable. However, in the case where each reverse portion is flexible, the width of the inner peripheral passage is widened according to the number of turns of the flat cable. In this way, it is possible to ensure smooth operation of tight winding of the flat cable.

The flexible sheet is preferably an insulating plastics material sheet. By using an insulating plastics material sheet, it is possible to manufacture a reverse member light in weight and at a low cost which is capable of securely insulating the flat cables in contact with the reverse ring.

Bending of the insulating plastics material sheet may be facilitated by making a bending portion thin. Preferably, the bending applied to the plastics material sheet is not a fully permanent deformation. However, the bending may leave the plastics material with a partial permanent deformation.

It is preferable to provide four reverse portions in the annular hollow space.

Of course, when four reverse portions are disposed in the annular hollow space, they can be used in any case where, for example, one, two, three or four flat cables are used.

When four reverse portions are disposed in the annular hollow portion, it is preferable that each of the four reverse portions (or rings) contacts the flat cable over a sufficient area to ensure that when the movable member rotates, the flat cable has a stable locus.

The number of the reverse portions is not limited to four but one, two or three reverse rings, or more than four reverse rings, may be used.

In another exemplary embodiment, the present invention provides a cable reel including:
  a stationary member;
  a rotatable member located with respect to the stationary member so as to define an annular hollow space between the rotatable and stationary members;
  a reverse member accommodated in the annular hollow space, the reverse member being formed in one piece from a flexible sheet and including a plurality of reverse portions and an annular member, the annular member being disposed centrally of the reverse portions, each reverse portion being formed by bending and looping an L-shaped arm projection which is disposed at a circumference of said annular member; and
  a flat cable accommodated in the annular hollow space, the flat cable having respective spaced portions fixed with respect to the stationary member and with respect to the rotatable member and an intermediate portion between the spaced portions which is wound on one of the reverse portions.

In another aspect, the present invention provides a method of forming a cable reel including the formation of a reverse member, wherein the reverse member has a plurality of reverse portions and a central annular member, the reverse portions being disposed at regular intervals in a circumferential direction around the central annular member, the reverse member being formed in one piece from a flexible sheet, the method including the step of bending and looping arm projections to form the plurality of reverse portions.

In another exemplary embodiment, the sheet is an annular sheet and the reverse portions are projections from a surface of the central annular member, the projections being formed by moulding of the annular sheet.

Preferably, the moulding operation gives reverse portions of a kidney shape. Preferably, the moulding is vacuum moulding. The reverse portions may be radially resiliently flexible.

Again, preferably the sheet is an insulating plastics material sheet.

As mentioned above, the reverse member including a plurality of the reverse portions may be formed in one piece by vacuum moulding of an annular sheet. Thus, the reverse member, which is accommodated in the annular hollow space, may be a single component. In this way, the number of component parts may be reduced.

The number of the flat cable-reversing portions required in the cable reel increases with the number of flat cables. However, since a plurality of reverse portions may be formed from one flexible sheet, it is possible to form the required number of reverse portions as a single reverse member component. Therefore, it is possible to reduce the number of component parts in the cable reel.

The formation of the reverse portions may be completed at the time of vacuum moulding. Assembly of the cable reel may be facilitated since the reverse portions are formed on the reverse member prior to assembly, so that it is only necessary simply to insert the reverse member into the annular hollow portion.

In an exemplary embodiment, the present invention provides a cable reel including:
  a stationary member;
  a rotatable member located with respect to the stationary member so as to define an annular hollow space between the rotatable and stationary members;
  a reverse member accommodated in the annular hollow space, the reverse member being formed by vacuum moulding from an annular sheet to give an annular member with moulded projections from a surface of the annular member, the projections being disposed at regular intervals in a circumferential direction around the annular member, each moulded projection being a reverse portion; and a flat cable accommodated in the annular hollow space, the flat cable having respective spaced portions fixed with respect to the stationary member and with respect to the rotatable member and an intermediate portion between the spaced portions which is wound on one of the reverse portions.

In a further aspect, the present invention provides a method of forming a cable reel including the formation of a reverse member, wherein the reverse member has a plurality of reverse portions, and an annular member, the reverse portions being disposed in a circumferential direction around said annular member.

The reverse member is formed in one piece by moulding of an annular sheet to give the reverse portions which project from a surface of the annular member.

In another aspect, the present invention provides a vehicle having a steering assembly including a cable reel according to any one of the above aspects.

BRIEF DESCRIPTION OF THE DRAWINGS

Embodiments of the invention will now be described by way of non-limitative example with reference to the drawings, in which:

FIGS. 2A, 2B and 2C show a process of forming a reverse member of the cable reel of the first embodiment, in which

FIGS. 6A, 6B and 6C show a process of forming a reverse member of a cable reel of a second embodiment of the invention, in which

FIGS. 7A and 7B show a reverse member of a cable reel of a third embodiment of the invention, in which

DETAILED DESCRIPTION OF PREFERRED EMBODIMENTS

A cable reel 1 of the present invention is described below with reference to FIGS. 1 to 5. A rotor 3 (rotatable or movable member) serving as an inner cylinder is relatively rotatably connected to a base case (stationary member) 7 serving as an outer cylinder. The base case 7 is fixed to a steering column (not shown) and has a peripheral wall 7a projecting from the periphery of an annular bottom wall 7b. The rotor 3 is fixed to a steering wheel (not shown) and has a closed portion 3d projecting from the periphery of one end surface of a cylindrical portion 3a.

Figure 3:
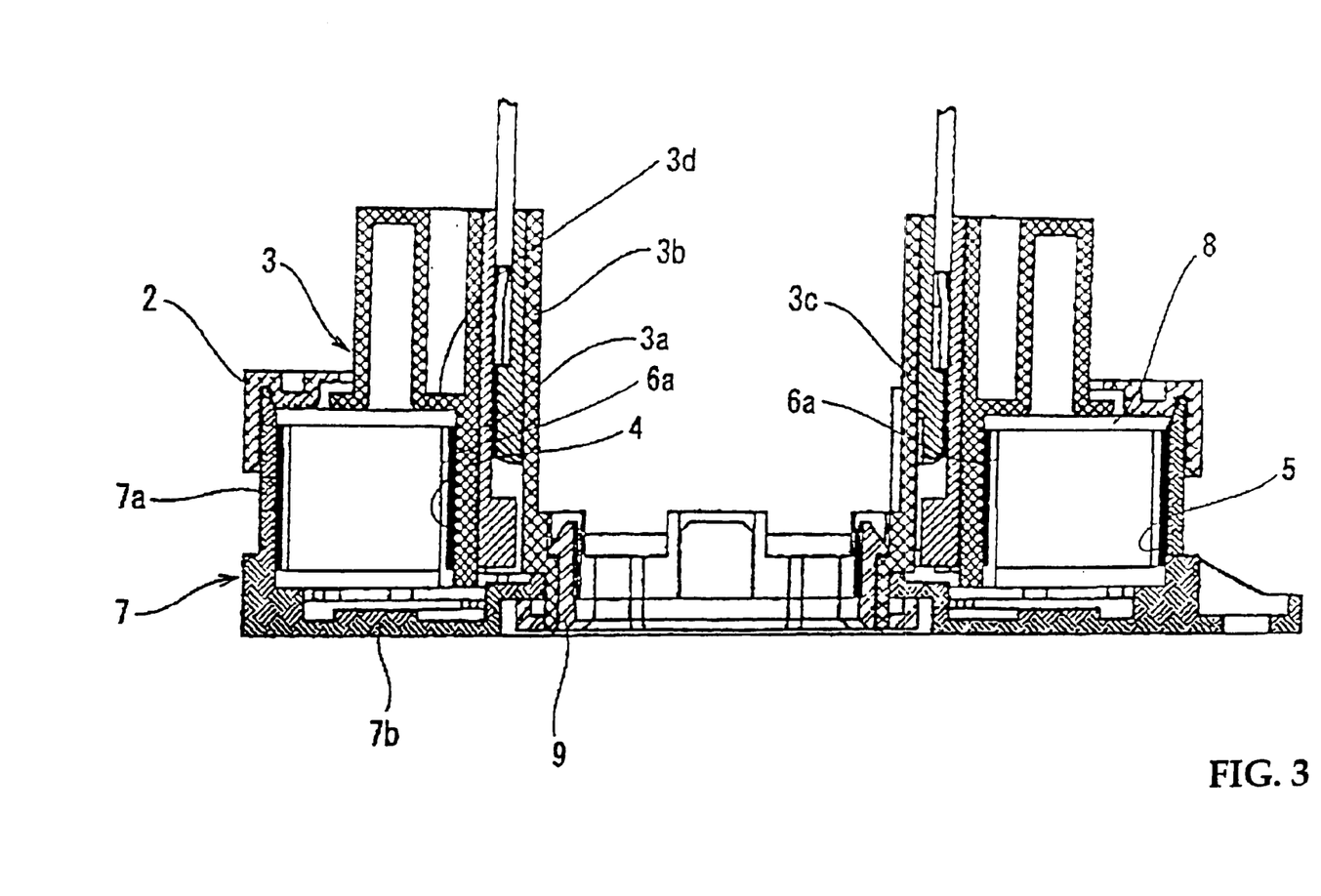
FIG. 3 is a vertical sectional view of the cable reel of the first embodiment.
Figure 4:
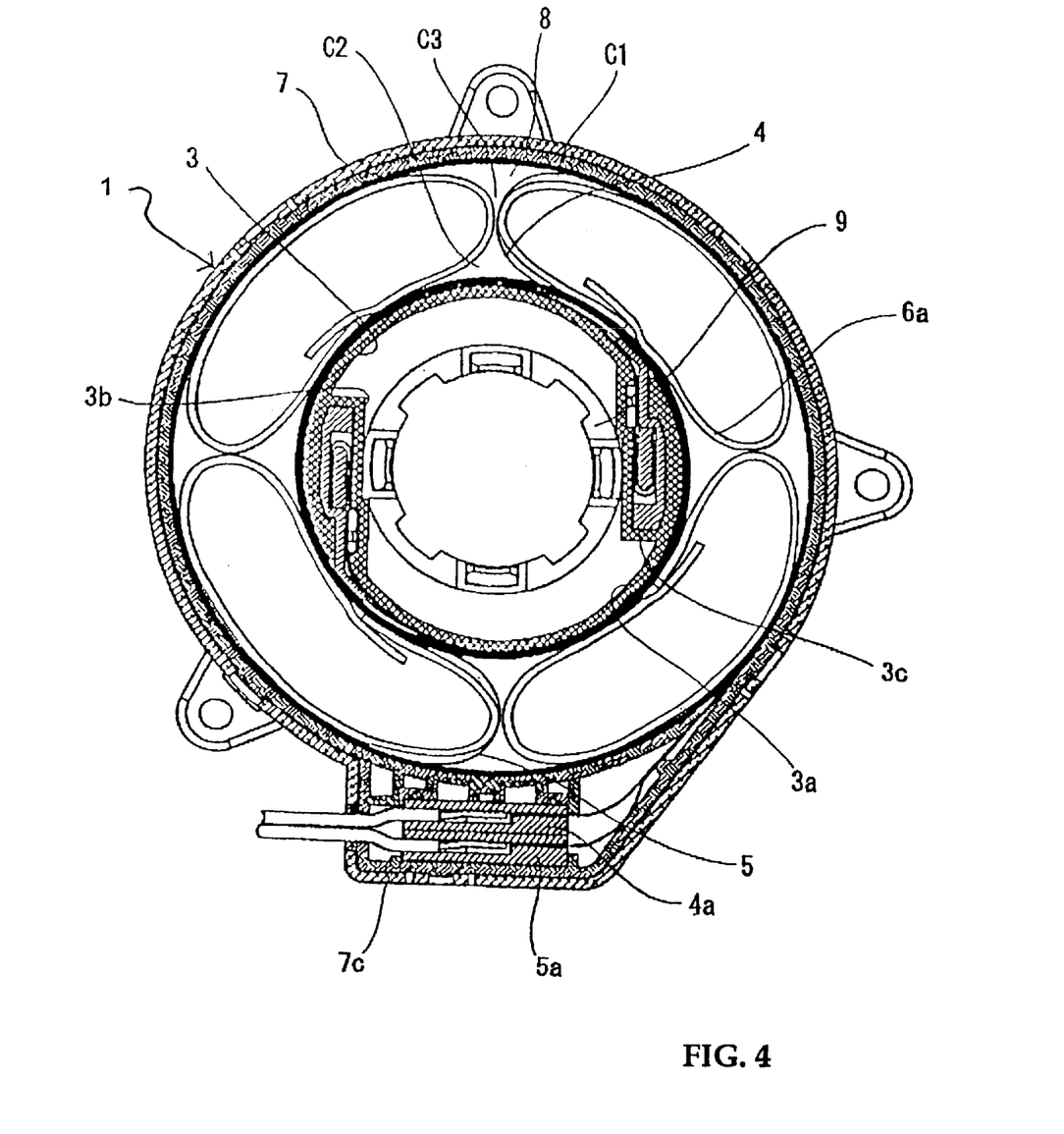
FIG. 4 is a horizontal sectional view of the cable reel of the first embodiment.
Figure 5:
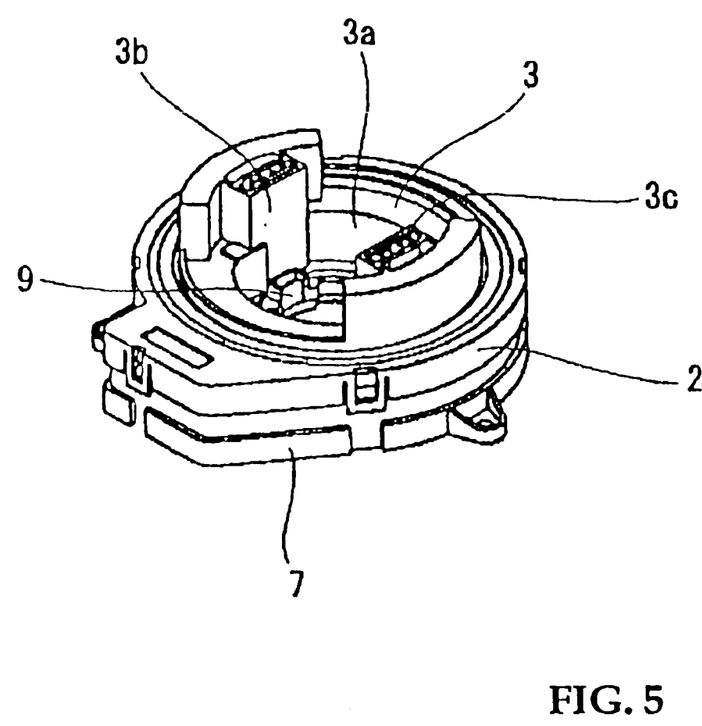
FIG. 5 is a perspective view of the cable reel of the first embodiment when the cable reel is viewed from above.

A reverse member 6 having four reverse rings 6a continuous with the periphery of a rotary ring 6b is accommodated in an annular hollow space 8 between the base case 7 and the rotor 3 in such a way that the rotary ring 6b is freely rotatable with respect to the inner and outer walls of the annular hollow space 8 (see FIGS. 3 and 4). The annular hollow space 8 accommodates flat wiring cables 4 and 5 each having a first end connected to connector portions 3b and 3c, respectively, of the rotor 3, with the flat cables 4 and 5 wound on the reverse rings 6a respectively. A connector accommodation portion 7c (see FIG. 4) fixed to the base case 7 accommodates connectors 4a and 5a connected to the other end of the flat cables 4 and 5, respectively.

The flat wiring cables 4 and 5 are provided for electrical connection of electrical components housed, e.g. in the steering wheel. Examples of such components are electrical sensors and actuators associated with an airbag located in the steering wheel, which must be electrically connected with other parts of the vehicle, e.g. the battery, to form operable electrical circuits. The cables 4 and 5 may extend further from the stationary member than shown in the drawings. For example, the flat cables may extend away from the steering assembly.

The rotor 3 has a top cover 9, and a locking member 2 (FIGS. 1 and 3) fixes the rotor 3 to a steering shaft (not shown).

The reverse member 6 is formed in a flat shape from a resiliently flexible electrically insulating plastics material sheet, and is bent into the required configuration. The thickness of this sheet is preferably in the range of from about 0.1 to about 1.0 mm and more preferably from about 0.4 to about 0.6 mm to allow the reverse member 6 to be suitably flexible. Any suitable materials can be used to form the sheet so long as they are flexible and resilient (preferably with electrically insulating properties). A polypropylene sheet is one example of a preferable material because it is lightweight and inexpensive.

Figure 1:
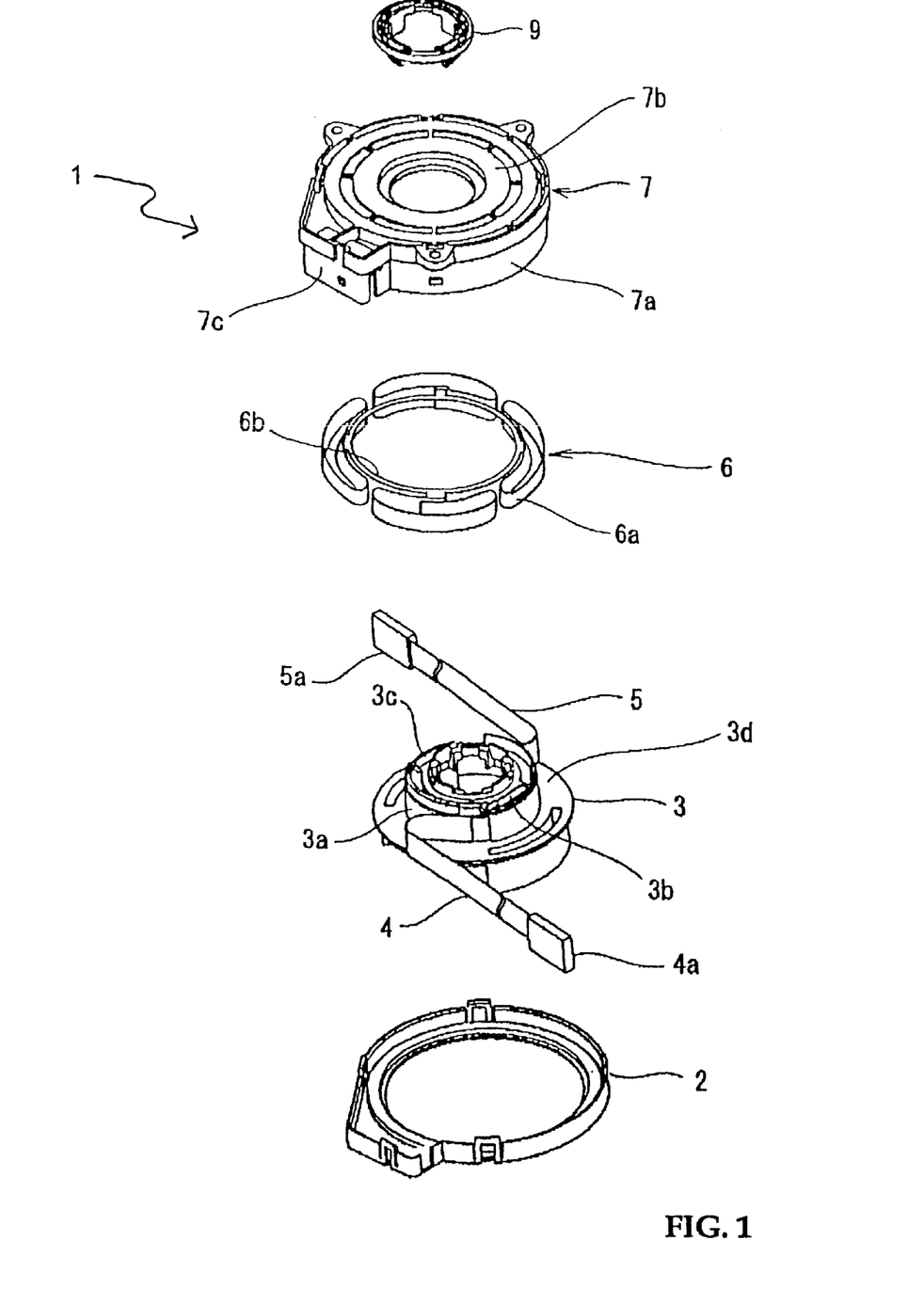
FIG. 1 is an exploded perspective view of component parts of a cable reel which is a first embodiment of the present invention.
Figure 2A:
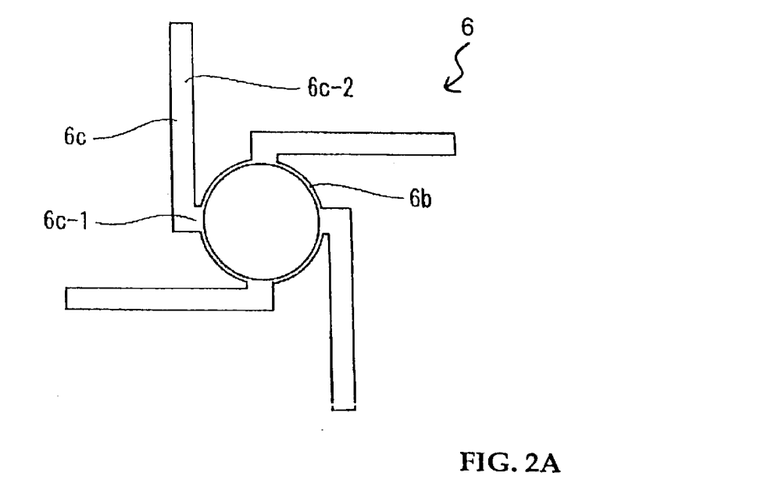
FIG. 2A is a view showing a punched sheet to form the reverse member and FIGS. 2B and 2C are perspective views each showing a bending process.

As shown in FIG. 2A, the insulating sheet is punched into a configuration having the annular rotary ring 6b (central annular portion) and four inverted L-shaped arms 6c projecting from the periphery of the rotary ring 6b at regular intervals in its circumferential direction. Each of the L-shaped arms 6c has a short transverse portion 6c-1 continuous with the rotary ring 6b and a long longitudinal portion 6c-2 continuous with the transverse portion 6c-1 and perpendicular to the transverse portion 6c-1.

Figure 2B:
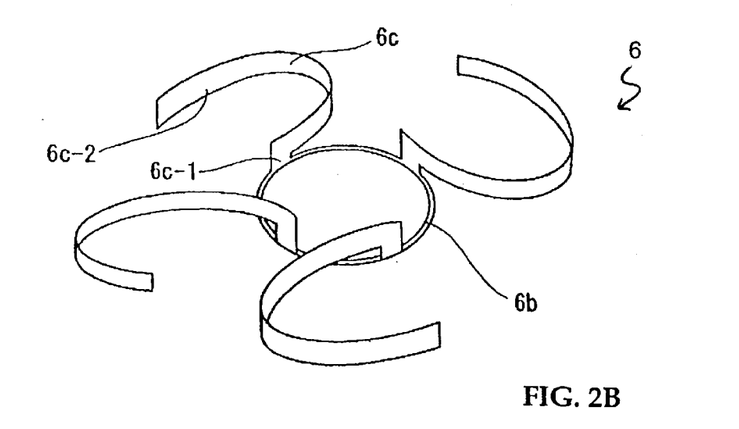
Figure 2C:
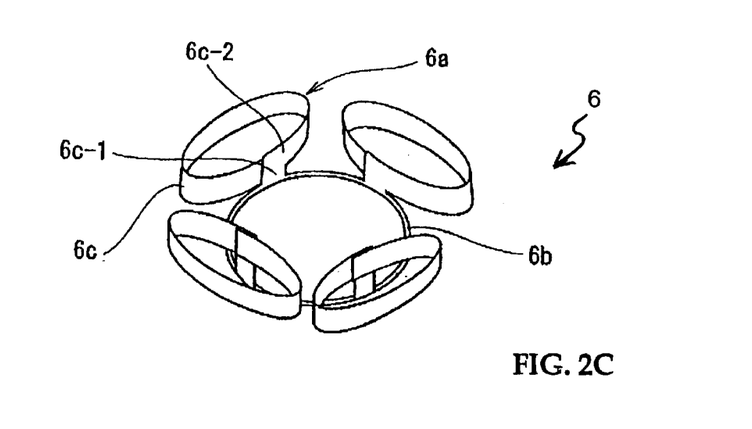

The sheet punched in the configuration as shown in FIG. 2A is then bent so that each arm 6c is bent upwardly perpendicularly at the transverse portion 6c-1, as shown in FIG. 2B. Each arm 6c is curved to a closed loop in such a way that the surface of the longitudinal portion 6c-2 confronting the center of the rotary ring 6b is disposed at the outer side of the rotary ring. In this manner, four upstanding reverse rings 6a are formed, as shown in FIG. 2C. In the first embodiment, the free end of the longitudinal portion 6c-2 is in excess in length and is not fixed but overlaps the near end of the reverse ring 6a when accommodated in the annular hollow space 8 to keep the reverse ring 6a as a closed loop of kidney shape.

As shown in FIGS. 3 and 4, the reverse member 6 obtained by bending the flat sheet is accommodated in the annular hollow space 8. The gap between the upper surface of the rotary ring 6b, namely, the peripheral surface of the rotor 3 and the inner peripheral surface of each reverse ring 6a provides an inner peripheral passage C2 for the flat cables 4 and 5. The gaps (four gaps in total) between the reverse rings 6a adjacent to each other circumferentially provide reverse gaps or portions C3 for the flat cables. The gap between the inner peripheral surface of the base case 7 and the peripheral surface of each reverse ring 6a provides a peripheral outer passage C1 for the flat cables.

More specifically, with one end of the flat cables 4 and 5 connected, respectively, to the connector portions 3b and 3c of the rotor 3, the flat cables 4 and may be wound counter-clockwise in the inner peripheral passage C2. Two of the reverse portions C3 are selected as passages. The winding direction of the flat cables 4 and 5 are reversed in the selected reverse portions C3, and the flat cables 4 and 5 are wound clockwise in the peripheral passage C1. The connector accommodation portion 7c accommodates the connectors 4a and 5a connected to the other end of the flat cables 4 and 5, respectively.

Further, because the reverse member 6 has four reverse rings 6a, the reverse member 6 can be used in any of the cases where the required number of the flat cables is one, two, three or four. Thus, it is not necessary to provide the reverse member in accordance with the number of the flat cables. That is, it is possible to reduce the number of parts.

The rotating operation of the cable reel 1 of the first embodiment will be described below.

When the rotor 3 rotates in unison with the rotation of the steering wheel (not shown), the flat cables 4 and 5 connected to the rotor 3 are operated in unison with the rotation of the rotor 3.

When the rotor 3 is rotated counterclockwise as seen in FIG. 4, a portion of each of the flat cables 4 and 5 present in the inner peripheral passage C2 reverses its winding direction via the reverse portion C3 and moves to the outer peripheral passage C1. Thus, most of the length of each of the flat cables 4 and 5 may be wound to a limit point in the outer peripheral passage C1.

On the other hand, when the rotor 3 is rotated in the reverse direction, namely clockwise, most of the length of the flat cables 4 and 5 is wound in the inner peripheral passage C2 to a limit point.

Because the reverse rings 6a are made of a resilient plastics sheet, they have a restoring force urging them to a flat configuration. That is, the reverse rings 6a in the annular hollow space 8 tend to expand radially so as always to minimize the width of each of the outer peripheral passage C1 and the inner peripheral passage C2.

Therefore, when the rotor 3 rotates, the flat cables 4 and 5 are pressed against the peripheral surface of the reverse rings 6a. Thus, the flat cables 4 and 5 are prevented from moving freely in the widthwise (radial) direction of each passage. Therefore, generation of vibrations or abnormal sounds can be suppressed.

The free end of each longitudinal portion 6c-2 is not fixed to the reverse ring 6a, but overlaps a portion of the reversing 6a. Thus, the diameter (radial dimension) of the reverse ring 6a can be flexibly enlarged or reduced with the reciprocation of the flat cables 4 and 5 in the peripheral passage C1 and the inner peripheral passage C2 caused by the rotation of the rotor 3.

In the first embodiment, although the cable reel 1 has two flat cables, the flat cables 4 and 5 can be pressed against the reverse rings 6a, with the flat cables 4 and 5 in contact with the reverse rings 6a over a wide area, by providing the cable reel with four reverse rings 6a. Therefore, it is easy to stabilize the rotary locus of the flat cables 4 and 5 and achieve a smooth rotary motion.

Figure 6A:
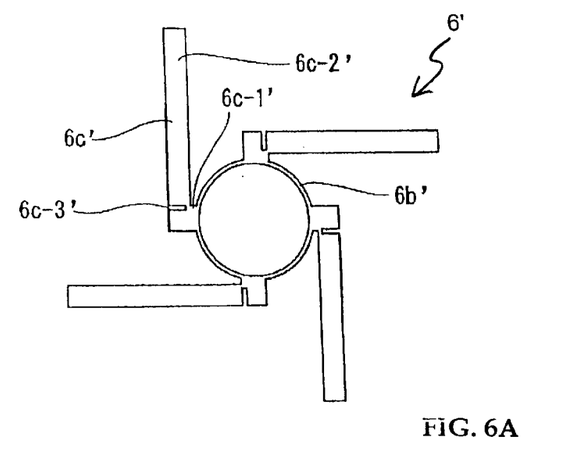
FIG. 6A is a view of a punched sheet to form the reverse member and FIGS. 6B and 6C are perspective views each showing a bending process.
Figure 6B:
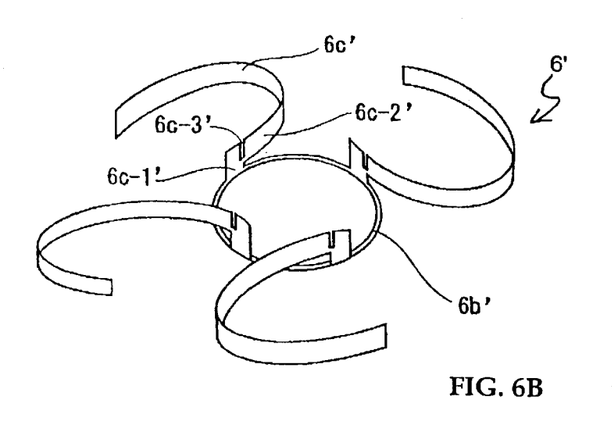
Figure 6C:
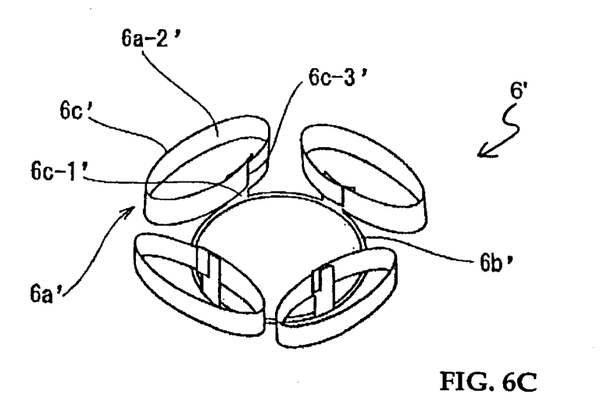

The cable reel of a second exemplary embodiment, shown in FIG. 6, is similar to that of the first embodiment except for the construction of the reverse member 6' of the second embodiment. Other parts will not be described again.

The reverse member 6' of the second embodiment is different from the reverse member 6 of the first embodiment in that the extremity of the arm 6c' which constitutes each reverse ring 6a' of the second embodiment is locked at a locking portion.

More specifically, as shown in FIG. 6A, the insulating plastics material sheet is punched to give a shape having a rotary ring 6b' and four L-shaped arms 6c' projecting from the periphery of the rotary ring 6b' at regular intervals in its circumferential direction. Each of the arms 6c' has a short transverse portion 6c-1' continuous with the rotary ring 6b', a long longitudinal portion 6c-2' continuous with the transverse portion 6c-1' and perpendicular thereto, and a locking slot 6c-3' in the form of a notch on a portion of the longitudinal portion 6c-2' at the side of the transverse portion 6c-1'. The slot 6c-3' is preferably perpendicular to the longitudinal direction of the longitudinal portion 6c-2'.

As shown in FIG. 6B, each arm 6c' is bent upward at the transverse portion 6c-1' lobe perpendicular to the rotary ring 6b'. Then each arm 6c' is curved cylindrically in such a way that the surface of each longitudinal portion 6c-2' facing the center of the rotary ring 6b' is the outer surface of the arm 6c'. Thereafter, as shown in FIG. 6C, the extremity of the longitudinal portion 6c-2' is inserted into the slot 6c-3' and thus locked thereto. Thus it is easy to form the four reverse rings 6a.

Since the longitudinal portion 6c-2' is locked at the slot 6c-3', it is prevented from restoring itself to a flat configuration. Thus, it is easy to perform an assembling operation when inserting the reverse rings 6a' in the annular hollow space 8.

Each reverse ring 6a' is flexible and resilient. Thus, when it is locked at the slot 6c-3', it has a restoring force urging it back towards a circular configuration from an elliptic configuration. That is, this restoring force acts to minimize the width of each of the outer peripheral passage C1, the inner peripheral passage C2. Similarly to the first embodiment, when the rotor 3 rotates, the flat cables 4 and 5 are pressed by the outer surfaces of the reverse rings 6a'. Accordingly, the flat cables 4 and 5 are prevented from freely moving in the widthwise (radial) direction of each passage. In this way, it is possible to suppress the generation of vibrations and abnormal sounds.

Figure 7A:
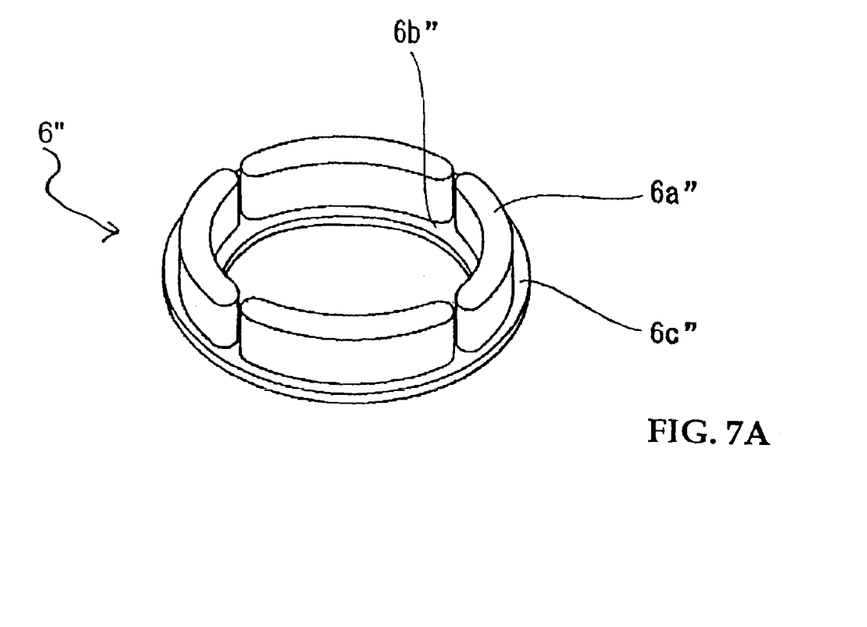
FIG. 7A is a perspective view in which the reverse member is viewed from above.
Figure 7B:
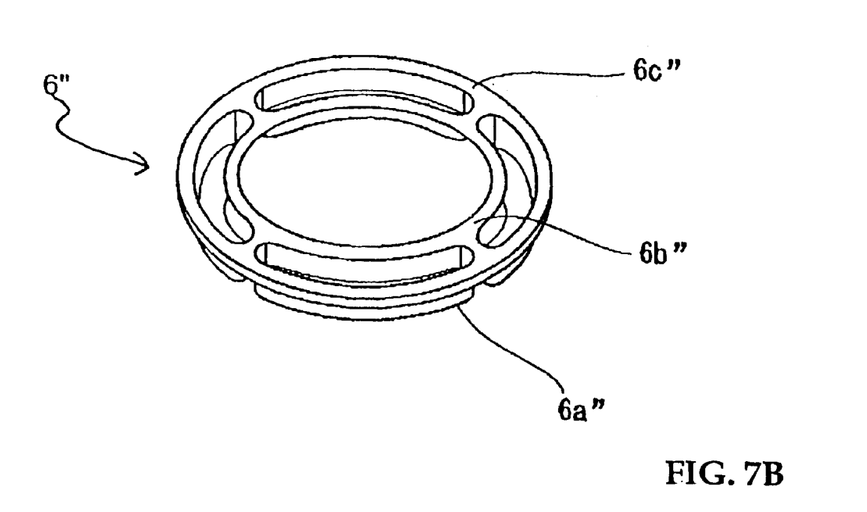
FIG. 7B is a perspective view in which the reverse member is viewed from below.

The cable reel of a third exemplary embodiment, shown in FIG. 7, is similar to that of the first and second embodiments except in the construction of the reverse member 6" in the annular hollow space 8. Other parts will not be described again.

As shown in FIGS. 7A and 7B, the reverse member 6" has four elliptically curved reverse portions 6a" formed by, for example, vacuum-moulding an annular plastics material sheet. The four reverse portions 6a" are spaced at regular intervals in the circumferential direction of the reverse member 6". The reverse member 6" has a planar peripheral flange providing an outer annular portion 6c" between its outer periphery and the reverse portions 6a" and an inner annular portion 6b" between its inner periphery and the reverse portions 6a'.

This construction allows the formation of the reverse member 6" to be completed by vacuum moulding, for example, and permits the reverse member 6" to be simply inserted into the annular hollow space 8, with the projecting reverse portions 6a" disposed at the upward side. That is, it is easy to perform the assembly work.

For the passage of the flat cables 4 and 5 in the annular hollow space 8, the gap between the upper surface of the inner annular portion 6b", the peripheral surface of the rotor 3 and the inner peripheral surface of each reverse portion 6a" forms the inner peripheral passage C2. The gaps (four gaps in total) between the reverse portions 6a" circumferentially adjacent to each other provide the reverse passages C3. The gap between the upper surface of the outer annular portion 6c", the inner peripheral surface of the base case 7 and the peripheral surface of each reverse portion 6a" provides the outer peripheral passage C1.

By setting the width of the inner peripheral passage C2, the outer peripheral passage C1, and the reverse passage C3 without providing an allowance, it is possible for the above construction to suppress the free movement of the flat cables 4 and 5 in the widthwise direction of the passages to a higher extent than the conventional construction. Even though the thickness of a bundle of the flat cables 4 and 5 is equal to the width of the passages, the flat cables 4 and 5 do not become incapable of moving because the reverse portions 6a" are flexible and thus capable of flexing inward.

Reverse portions 6a" are kidney-shaped and are radially (i.e. in directions parallel to the plane of the planar peripheral flange) resiliently flexible. Thus, the reverse portions 6a" may be distorted in this direction by flat cables sandwiched between the reverse portions 6a" and the inner peripheral surface of the base case. In this way, the flat cables are sandwiched and pressed by the resilient reverse portions 6a'.

As in the case of the first and second embodiments, the third embodiment has the effect of reducing the number of component parts.

As will be apparent from the foregoing description of the first and second embodiments, the flat cable-reversing member which is accommodated in the annular hollow space of the cable reel may be formed in one piece from a flexible sheet. Thus, a plurality of the reverse loops are formed from one piece of material. In this way it is possible to reduce the number of component parts and manufacturing cost. Further, assembly is easy and time and labor are reduced. In particular, when the reverse loops are formed from an insulating sheet, it is possible to reliably insulate the flat cables.

Each reverse loop is made of the resilient flexible plastics sheet curved in a kidney shape when assembled in the cable reel. Each loop is radially expansible. Thereby each flat cable is sandwiched between the outer surface of a reverse loop and the inner surface of the annular hollow space and pressed between them. When the flat cable is wound, this sandwiching makes it difficult for the flat cable to move freely in a direction perpendicular to its winding direction. Thus it is possible to suppress generation of vibrations and abnormal sounds.

In the second embodiment, the end of each of the reverse loops is inserted into and locked at the slot formed at the base end portion of the arm of the ring. Thereby it is easy to ensure that the reverse loop keeps its cylindrical configuration. Thus it is easy to perform an assembling operation when accommodating the reverse loop in the annular hollow space.

In the third embodiment, by forming a plurality of the reverse portions integrally by vacuum moulding or the like of an annular sheet, a single member is accommodated in the annular hollow space. Thus, it is possible to reduce the number of component parts. In this case, the formation of the reverse portions is completed at the time of vacuum moulding, or the like, and it is easy to perform the assembling work.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A cable reel comprising:
   a stationary member;
   a rotatable member located with respect to said stationary member so as to define an annular hollow space between said rotatable member and said stationary member;
   a reverse member accommodated in said annular hollow space, said reverse member being a one-piece member including a plurality of reverse portions and an annular member, a plurality of passages being provided between adjacent ones of the reverse portions; and
   at least one flat cable accommodated in said annular hollow space, said at least one flat cable having respective spaced portions, fixed with respect to said stationary member and with respect to said rotatable member, respectively, and an intermediate portion between said spaced portions which is wound on one of said reverse portions, each flat cable passing through a respective one of the passages.

2. A cable reel according to claim 1, wherein said reverse member is formed from a resiliently flexible sheet.

3. A cable reel according to claim 1, wherein said reverse portions are radially expansible loops that press part of the intermediate portion of the at least one flat cable against the stationary member.

4. A cable reel according to claim 1, wherein each reverse portion is a loop formed by looping an arm projecting from the annular member.

5. A cable reel according to claim 4, wherein said arm has a fixed end, fixed to the annular member, and a free end, said free end being slidably movable with respect to said fixed end.

6. A cable reel according to claim 4, wherein said arm has a fixed end, fixed to the annular member, and a free end, said free end being lockable to the fixed end in order to retain the loop.

7. A cable reel according to claim 6, wherein the free end of the arm is lockable to the fixed end of the arm via a slot.

8. A cable reel according to claim 4, wherein each arm projection is L-shaped.

9. A cable reel according to claim 8, wherein each L-shaped arm projection includes a short transverse portion and a long longitudinal portion, the transverse portion connecting the longitudinal portion to the annular member.

10. A cable reel according to claim 8, wherein, for each L-shaped projection, the transverse portion is bent perpendicularly to the annular member, and the longitudinal portion is looped to form one of the reverse portions.

11. A cable reel according to claim 1, wherein the annular member is disposed centrally of the reverse portions.

12. A cable reel according to claim 1, wherein the reverse portions are formed by moulding.

13. A cable reel according to claim 12, wherein the moulding is vacuum moulding, and the reverse portions are projections from a surface of the annular member formed from an annular sheet by the vacuum molding.

14. A cable reel according to claim 1, wherein the reverse member is of an insulating plastics material.

15. A cable reel according to claim 1, wherein the reverse member has four of the reverse portions.

16. A vehicle having a steering assembly with a cable reel according to claim 1.

17. A cable reel comprising:
   a stationary member;
   a rotatable member located with respect to said stationary member so as to define an annular hollow space between said rotatable member and said stationary member;
   a reverse member accommodated in said annular hollow space, said reverse member being formed in one piece from a flexible sheet and including a plurality of reverse portions and an annular member, the annular member being disposed centrally of the reverse portion, each reverse portion being formed by bending and looping an L-shaped arm projection which is disposed at a circumference of said annular member; and
   at least one flat cable accommodated in said annular hollow space, said at least one flat cable having respective spaced portions fixed with respect to said stationary member and with respect to said rotatable member and an intermediate portion between said spaced portions which is wound on one of said reverse portions.

18. A cable reel comprising:
   a stationary member;
   a rotatable member located with respect to said stationary member so as to define an annular hollow space between said rotatable member and said stationary member;
   a reverse member accommodated in said annular hollow space, said reverse member being formed by vacuum moulding from an annular sheet to give an annular member with moulded projections from a surface of the annular member, the projections being disposed at regular intervals in a circumferential direction around said annular member, each moulded projection being a reverse portion; and
   at least one flat cable accommodated in said annular hollow space, said at least one flat cable having respective spaced portions fixed with respect to said stationary member and with respect to said rotatable member and an intermediate portion between said spaced portions which is wound on one of said reverse portions.

19. A method of forming a cable reel including the formation of a reverse member, wherein the reverse member has a plurality of reverse portions and a central annular member, the reverse portions capable of reversing a direction of a flat cable and being disposed at regular intervals in a circumferential direction around said central annular member, the method comprising:
   forming said reverse member in one piece from a flexible sheet; and
   bending and looping arm projections of said reverse member to form said plurality of reverse portions.

20. A method of forming a cable reel including the formation of a reverse member, wherein the reverse member has a plurality of reverse portions and an annular member, the reverse portions capable of reversing a direction of a flat cable and being disposed in a circumferential direction around said annular member, the method comprising:
   forming the reverse member in one piece by moulding of an annular sheet to give the reverse portions which project from a surface of the annular member.

21. A method according to claim 19, further comprising providing a slot in each of the arm projections, the arm projections having a fixed end, fixed to the central annular member and a free end, wherein the bending and looping step includes placing the free end in the slot.

* * * * *